UNITED STATES PATENT OFFICE.

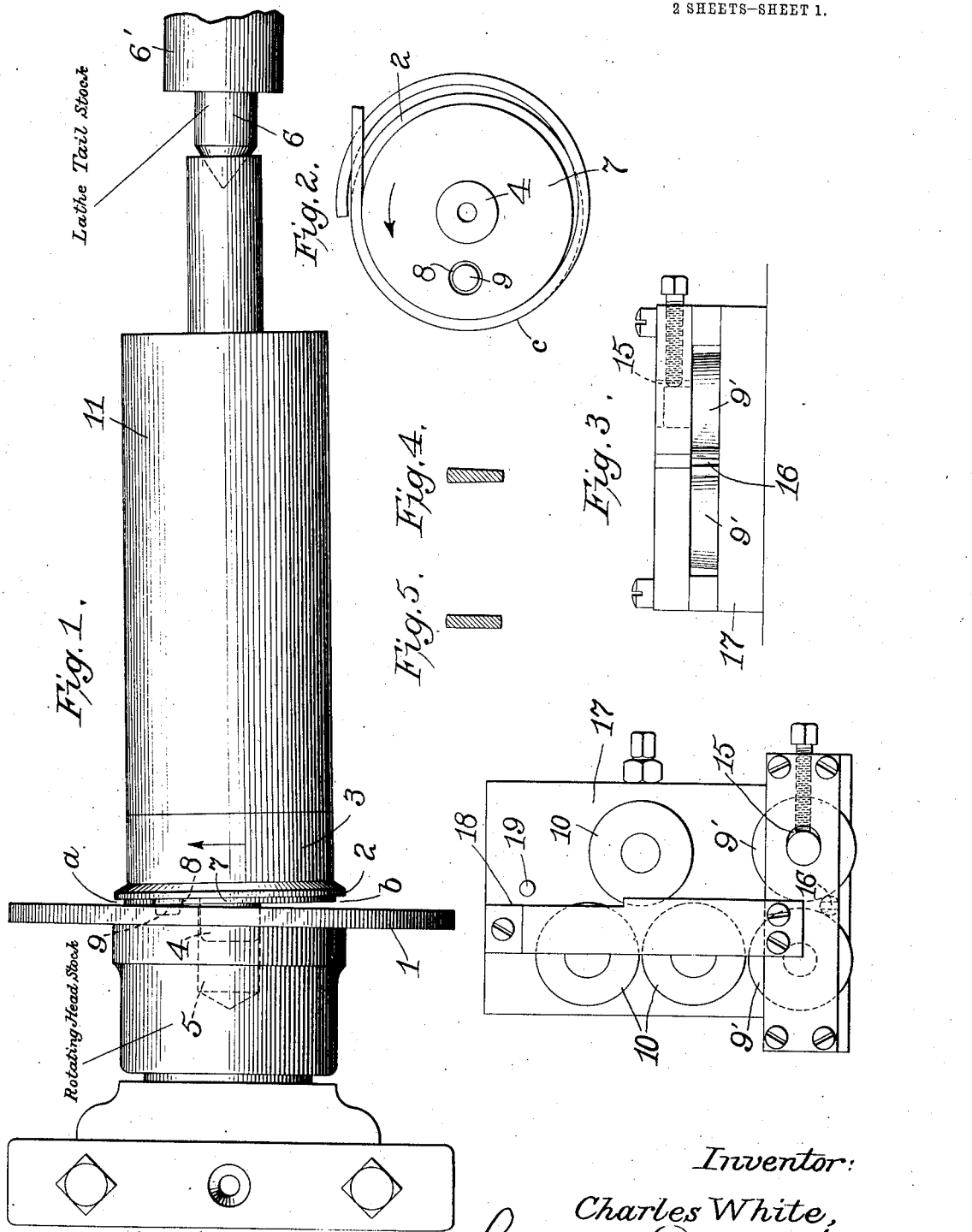

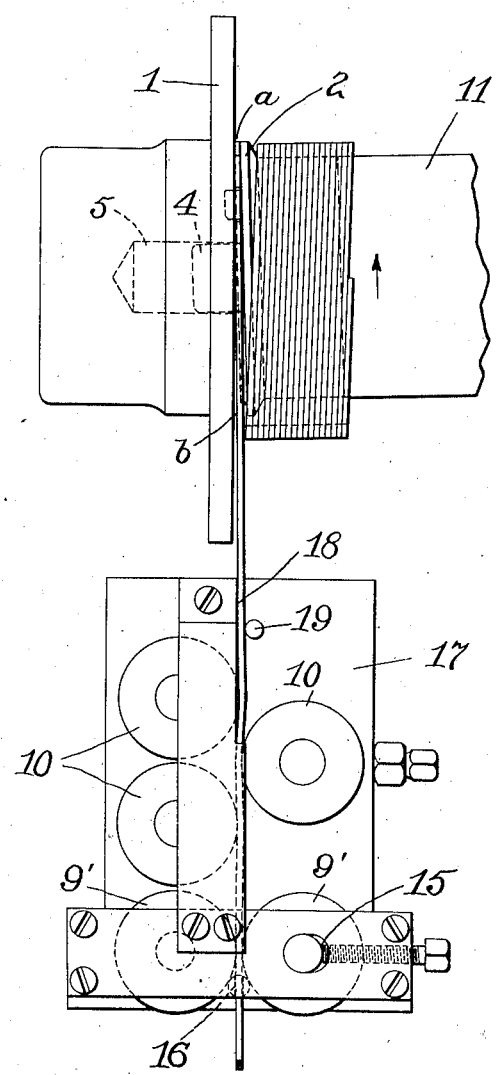

CHARLES WHITE, OF BALTIMORE, MARYLAND.

APPARATUS FOR MAKING PISTON PACKING-RINGS.

1,107,005.  Specification of Letters Patent.  Patented Aug. 11, 1914.

Application filed May 26, 1913, Serial No. 769,970. Renewed June 30, 1914. Serial No. 848,306.

*To all whom it may concern:*

Be it known that I, CHARLES WHITE, a citizen of the United States, residing at Baltimore, Maryland, have invented certain new and useful Improvements in Apparatus for Making Piston Packing-Rings, of which the following is a specification.

It is the object of my invention to form piston rings or the like from a flat wire by bending the same edgewise, and my present invention relates to the apparatus for carrying on the work rapidly and with little expense.

In the accompanying drawings Figure 1 is a plan view of the tool used for bending the wire edgewise. Fig. 2 is a face view of one member of the tool with the wire bent about the same. Fig. 3 is a front view of the wire forming rolls. Fig. 4 is a cross sectional view of the wire before it is passed through the forming rolls. Fig. 5 is a similar view of the wire when bent into ring form. Fig. 6 is a plan view similar to Fig. 1 and of a portion of the apparatus shown in Fig. 1 showing the convolutions of the wire as they come from between the opposing lateral faces of the disks 1 and 2.

In forming the rings the flat wire, which is of wrought metal with rounded edges, is directed on edge to a forming tool which turns or bends the wire into ring or other form with the width of the wire at right angles to the axis of the ring, the convolutions of the wire lying side by side and being subsequently cut to separate the convolutions into separate rings.

The bending or forming tool comprises a plate or disk 1 which is suitably attached to the head-stock of an ordinary lathe and is rotated by the ordinary gearing at said head stock; a disk 2 arranged opposite the disk 1 and mounted on a spindle 3, said disk or spindle having a journal 4 entering a socket or opening 5 in the disk 1. The other end of the spindle is supported rotatably on the pin 6 of the tail stock of the lathe, a portion of which is shown at 6'. This tail stock is adjusted to such a position that its supporting pin will be axially out of line with the axis of the disk 1 and therefore the juxtaposed faces of this disk and the disk 2 will lie in planes inclined in respect to each other. Between these disks a forming member is placed, about which the wire is bent edgewise, and while this member may be variously arranged, in the particular construction used to illustrate my invention, it consists of a flat disk 7 of about the same thickness as the flat wire from which the rings are to be made, said disk being preferably formed independently of the gripping disks 1 and 2 and being mounted on the journal stud 4 and having an opening 8 through which a stud 9 passes, said stud, in this particular form shown, being mounted on the disk 2 and extending into a socket or opening in the disk 1. By this means the disk 2, together with the spindle upon which it is mounted, is rotated in unison with the disk 1, this being a convenient and simple way of accomplishing the desired result.

It will be seen from Fig. 1, which represents a plan view of the tool or apparatus for forming the wire into ring shape, that the two disks 1 and 2 lie with their faces close together at the point $a$ at the rear of the tool, from which point their faces diverge from each other to the point $b$ of widest separation at the front of the tool. The two disks at the point $a$ are close enough together to firmly grip the wire between them by bearing upon the sides thereof and when the disks are rotated the wire will be drawn forward and around the edge of the forming disk 7, which action will result in giving the circular or ring shape to the wire of the proper size to fit the piston and cylinder. In this bending action the wire is under resistance due to its passage through forming and straightening rolls 9' and 10 hereinafter more particularly referred to. It will be noticed that the wire after passing the point where the faces of the disks more nearly approach, will be gradually released from the gripping pressure of the disks and will finally reach a point in the circuit of the forming tool where it will be completely released, the point of full release being approximately at $c$, and here the wire, due to its natural tendency to spring outwardly, will assume a diameter larger than that of the forming disk 7 and sufficient to pass over the edge of the disk 2, and as a result of this, as the action proceeds, the bent wire will assume the form of series of convolutions lying side by side and encircling the spindle until the spindle is covered from end to end. For supporting the convolutions as they come from the gripping and forming disks the spindle may be provided with a cylindrical sheath of wood 11, or other suitable material, or the spindle itself may be of sufficient diameter for this purpose. Each convolution when made is discharged from the forming elements as complete, so far as the general ring shape is concerned, ready for the subsequent finishing, for instance by grinding and cutting. With the present form of apparatus each turn of wire, as it were, is made separate and distinct from every other turn and in effect as though separate pieces of wire were used one for each turn. Another result of this is that when the convolutions are cut longitudinally of the series or in a direction parallel with the axis of the convolute tube to separate them into separate rings each of these will lie in the same plane throughout, one end of the rings alining with the other end face of the wire and having no tendency to spring laterally out of line.

In bending the flat wire in the direction of its width or edgewise the metal is stretched along the outer edge and portions of the wire or at the point of larger diameter, while at the inner edge or portions it is condensed and as a result the wire in addition to any inherent springiness, is given an additional spring effect when in ring form causing it to spring outwardly when released from the grip of the disks 1 and 2 and assume a circular form of larger diameter than that of the edge of the forming disk 7. This as above described enables the convolutions to pass over the edge of the gripping disk 2 and away from the forming members as the next convolution is formed. In the completed article this tendency to spring outward keeps the ring in contact with the cylinder. The attenuation of the metal of the flat wire at its outer edge or portions, due to the drawing and bending action, will produce a deformation in the cross sectional shape of the wire and if a wire be used which is perfectly rectangular in cross section the cross sectional shape of the wire of the ring will be tapered from the inner to the outer edge thereof. To compensate for this change in the cross sectional shape of the wire and to produce a ring the flat sides of which, in the finished article, will be parallel with each other, I give the wire such a preliminary form previous to its entrance between the disks 1 and 2 which will produce the final form desired. For this purpose I provide the forming rolls 9′ between which the wire passes on its way to the bending tool. The wire is sufficiently soft to be changed by the rolls from a rectangular cross sectional shape to the form shown in Fig. 4, the upper edge here being that which will be the outside edge of the ring, and this is of a thickness to compensate for its reduction or attenuation in the bending action. In the present instance the wire is to be of rectangular cross sectional shape in its final form. This preliminary formation of the wire takes place on one part of the wire simultaneously with the bending operation upon the other part. The turning of the bending tool serves to draw the wire through the forming rolls. One of these rolls is adjustable in relation to the other as shown at 15. A guide throat 16 is employed in advance of the forming rolls. Any desired number of straightening rolls may be employed. I have shown three at 10. It will be observed that all the members of the bending tool rotate and there is no frictional action between the wire strip and the bending members, such as would result from drawing the wire through a die. The plate 17 which supports the forming and straightening rolls is adjustable on its supporting stand by any suitable means in a direction along the wire and also in a direction lengthwise of the spindle in order to bring the guide bearing 18 and guide pin 19 in proper relation to the bite of the disks 1 and 2. After the wire is bent into ring form with the convolutions lying side by side it is separated into separate rings by cutting the coil of wire lengthwise. Before the cutting is done however, the coil may be placed on a suitable mandrel and ground on its outer surface to the desired diameter.

It will be understood that the angle at which the two disks lie is shown exaggerated in Fig. 1. In practice this inclined relation is very slight, the separation of the disks at the widest point being but one or two thousandths of an inch greater than that where the gripping of the wire takes place. Different shapes of coils may be produced, circular, oval, oblong or the like by using forming disks 7 of the desired shape. Different diameters of rings or other forms may be bent with the same disk 1 by taking out one spindle having a disk 2 and former 7 of one size and substituting therefor a spindle having a different size disk and former.

While I have referred to the gripping members as disks other means may be employed, as ring shaped clamping members. By the use of a larger disk 1 the face of this affords a bearing or gripping face for many different diameters of rings.

The invention is not limited to rings for pistons as the product of the tool can be used for other purposes, either in separate pieces or in a series of connected convolutions.

The wire employed is of spring character.

It will be seen that the two gripping members have their lateral faces opposite each other, as distinguished from an arrangement having their peripheral faces opposed to each other. These plain lateral faces are inclined in respect to each other so that they will grip the wire between them at one point and release it at another point, due to the inclination of said lateral faces.

Having thus described my invention what I claim is:—

1. In apparatus of the class described, two gripping members having their opposing lateral faces lying and rotating in planes inclined to each other to grip the wire at one point between them and release it at another point in the circuit of the members and a forming member between the said gripping faces about which the wire is bent when carried by said gripping members, substantially as described.

2. In apparatus of the class described, two gripping members having their opposing lateral faces lying and rotating in planes inclined to each other to grip the wire at one point between them and release it at another point in the circuit of the members and a forming member between the said gripping faces about which the wire is bent when carried by said gripping members, said forming member rotating with the gripping members, substantially as described.

3. In combination the two rotary disks arranged with the axis of one inclined to the axis of the other, whereby the opposing lateral faces of the disks will be near each other at one point to grip the flat wire between them and more widely separated at another point to release the wire and a forming portion between the members and of smaller diameter than the gripping surfaces, about which the wire is carried and bent by the said gripping disks, substantially as described.

4. In combination a rotary member, a second rotary member arranged with its lateral face opposite that of the first member, said members rotating on axes inclined in relation to each other, whereby their lateral faces will rotate in planes inclined to each other to grip a wire between them at one point and release it at another point, one of said members having a journal entering a bearing in the other member and a forming member between the two gripping members, substantially as described.

5. In combination the two disks set with their opposing lateral faces in planes inclined to each other to grip a wire at one point between the said opposing lateral faces and to release the same at another point, a former between the disks and a driving connection extending from one disk to the other, substantially as described.

6. In combination two rotating disks set with their opposing lateral faces in planes inclined to each other, a former between them, about which a flat wire may be bent edgewise while its flat side faces are gripped between the disks, and means for sizing, shaping and straightening the flat wire, said wire being drawn through said means by the action of the rotating disks, substantially as described.

7. In combination the two members set with their lateral faces opposed and rotating in planes inclined to each other, one of the members having a journal entering a bearing in the other member, a pin projecting from one member into the other for driving them in unison, and a former disk mounted on the journal pin and having an opening for the pin to pass through, substantially as described.

In testimony whereof, I affix my signature in presence of two witnesses.

CHARLES WHITE.

Witnesses:
 EILEEN A. HEMSLEY,
 RICHARD B. PUE.